(No Model.)
M. THOMAS, Jr.
FEEDER FOR THRASHING MACHINES.
No. 254,177. Patented Feb. 28, 1882.
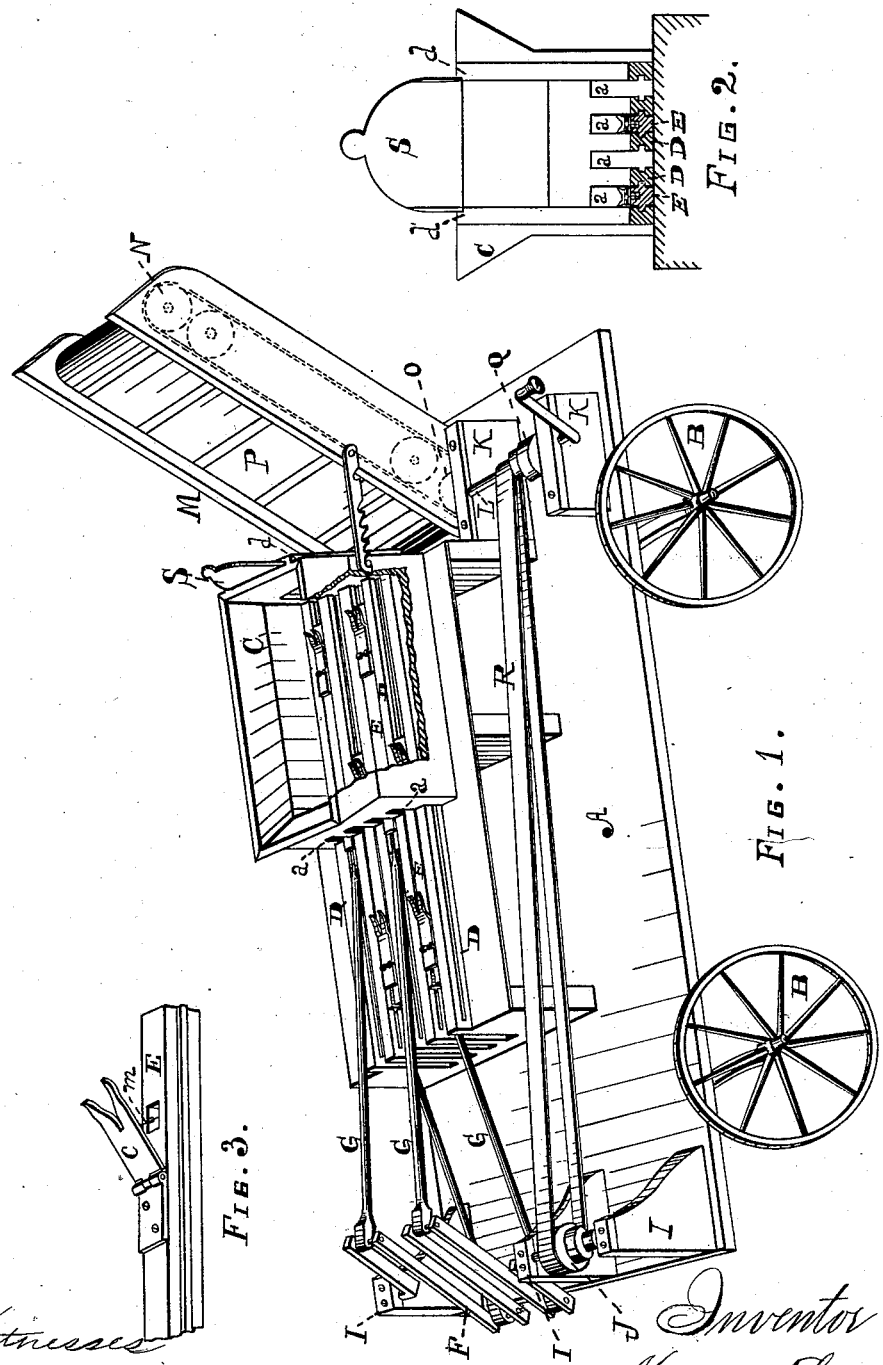

UNITED STATES PATENT OFFICE.

MASSEY THOMAS, JR., OF GILROY, CALIFORNIA.

FEEDER FOR THRASHING-MACHINES.

SPECIFICATION forming part of Letters Patent No. 254,177, dated February 28, 1882.

Application filed June 1, 1881. (No model.)

*To all whom it may concern:*

Be it known that I, MASSEY THOMAS, Jr., of Gilroy, county of Santa Clara, State of California, have invented an Improved Feeder for Thrashing-Machines; and I hereby declare the following to be a full, clear, and exact description thereof.

My invention relates to that class of agricultural implements known as "feeders for thrashing-machines," which are used to receive the grain and straw placed upon them by the derrick, and which sustain the elevator upon which the straw is raked or hoed down, and by which it is carried up to the self-feeder preparatory to being fed into the thrashing-cylinder.

My invention consists in the following construction and arrangement of the devices, which will be hereinafter fully described, and the points of novelty pointed out in the claim.

The usual operation of feeding grain and straw to a thrashing-machine consists in forking it from the stacks by means of a derrick and depositing it upon the forward end of the derrick-wagon. It is then hoed down by hand upon the elevator, which carries it up to the self-feeder, by which it is fed to the thrashing-cylinder.

My invention has for its object the employment of mechanism to feed the grain and straw to the elevator, and by a proper construction thereof so regulate the feed as to dispense with direct manual labor in hoeing down, and feed regularly and properly to the self-feeder above, thus assisting the self-feeder and aiding the whole operation. Its object is separate from that of the self-feeder, the latter being used to feed to the cylinder and having to receive its own supply from a source regulated by hand, and consequently all the regularity and separating out must be done by itself, while the former is used to precede this operation and feed to it with the regularity and precision of mechanism, instead of employing manual labor.

Referring to the accompanying drawings, Figure 1 is a perspective view of my machine. Fig. 2 is an end elevation of hopper and sliding door. Fig. 3 is an enlarged view of hinged forks.

A represents a wagon-body, set on wheels B. C is a hopper, properly supported upon the body A. This hopper has straight sides and a flaring top, as shown.

D D are guides, secured to the floor of the hopper, and extending forward upon the support. They are so placed as to form a space or channel between them, and have grooves in the edges. Between them are the arms E E, having side tongues fitting in the grooves of the guides D D. These arms E E are adapted to slide back and forth over the bottom of the hopper, between the guides D D, by means of the crank-shaft F and connecting-rods G, which are attached to the said crank and to the ends of the arms E E, so as to give to said arms a reciprocating motion within the hopper. One end of the hopper is provided with slots $a$, and the other end is open. Upon the arms are the forks $c$, having their forward ends attached to the arms. These forks consist of two parts, hinged as shown, and have the rear ends made in prongs. The object of having the rear part hinged to the forward portion is that when traveling backward the straw will catch and raise them up, thus facilitating the operation of the forks, which can catch the straw better. They are prevented from rising too high by any securing device, as shown at $m$. When returning they fall down and lie flat upon the arms, and do not interfere in any way with (rather aiding) the motion of the arms.

The crank-shaft F is journaled in standards I, and carries a cone-pulley, J.

Upon the rear part of the wagon are the standards K, in which is journaled a shaft, L. Upon the shaft, behind the hopper, is pivoted the frame M, in the rear end of which is a roller or drum, N. There is a roller, O, upon the shaft L between the sides of the frame M. Over these two rollers passes the elevator-belt or draper P. The forward end of the frame M is pivoted lower than the open rear of the hopper, so that the draper P will be under said opening and receive the grain and straw which are pushed out. In the ordinary forms now in use the elevator has to be unloaded and laid upon the wagon when moving from one stack to another; but by thus supporting and pivoting it behind the hopper it is always ready to receive the straw, and can be moved as it stands. Any appropriate device can be used to vary its inclination.

Upon the shaft L is a cone-pulley, Q, over which a belt, R, passes, and extends to and over the cone-pulley J. Power is applied to the shaft L, and is transmitted to the elevator-draper P and to the crank-shaft F and connecting-rods G, whereby the reciprocating arms E E are moved.

By driving the device from the shaft L and using the cone-pulleys J and Q, I am enabled to regulate the speed of the arms E E, and thus regulate the feed. To further regulate the feed, I have the door S, which slides vertically in guides d d and covers the open rear end of the hopper. By adjusting in any appropriate manner the height of the door S more or less grain and straw will be pushed upon the elevator P.

I have not here shown the derrick, because I use any ordinary form; but instead of causing it to fork the grain and straw upon the wagon-body, as is usual, I cause it to feed directly into the hopper C. No intermediate manual labor is required, the hopper is kept full, and the arms E E, with their hinged forks c, push it back from the bottom, separating it out and directing it regularly upon the elevator. It is then carried up to the self-feeders, by which it is fed to the thrashing-cylinder. The supply can thus be regulated from the beginning and the self-feeder assisted in its operation. I am enabled to accomplish this result by the use of the hopper and causing the derrick to feed directly therein. Pushing the grain and straw back from below, a continual supply is kept up, while the hopper is always kept full.

I am aware that there are self-feeding devices which connect directly with the thrashing-cylinder and feed to it, and that these devices have reciprocating feeder-arms provided with forks, and regulate the supply. They usually consist, however, of a feeding-floor, generally inclined and leading directly to the cylinder. The application of these devices to the purpose of my invention could not well be made, because it requires a deep hopper or equivalent receptacle for the derrick to feed into. The application of this device is for a different purpose and requires a changed construction to accomplish the result.

I do not lay any claim broadly to a feeding device having reciprocating feeding-arms; but What I do claim as new, and desire to secure by Letters Patent, is—

The hopper C, having sliding door S, reciprocating arms E, having guide-tongues and forks c, constructed substantially as described, pitmen G, crank-shaft F, pulleys J and Q, belt R, shaft L, and the elevator P, pivoted in front and below said hopper, all constructed to operate in combination in the manner set forth, and for the purpose described.

In witness whereof I hereunto set my hand.

MASSEY THOMAS, Jr.

Witnesses:
WM. F. BOOTH,
S. H. NOURSE.